March 21, 1967 ETSURO NAKAMICHI 3,310,790

PERFORATED MAGNETIC TAPE RECORDING AND REPRODUCING APPARATUS

Filed Nov. 21, 1962 6 Sheets-Sheet 1

March 21, 1967 ETSURO NAKAMICHI 3,310,790

PERFORATED MAGNETIC TAPE RECORDING AND REPRODUCING APPARATUS

Filed Nov. 21, 1962 6 Sheets-Sheet 3

United States Patent Office 3,310,790
Patented Mar. 21, 1967

3,310,790
PERFORATED MAGNETIC TAPE RECORDING AND REPRODUCING APPARATUS

Etsuro Nakamichi, 142 Kitazawa 2-chome, Setagaya-ku, Tokyo, Japan

Filed Nov. 21, 1962, Ser. No. 239,198
Claims priority, application Japan, Nov. 21, 1961, 36/42,489; Mar. 10, 1962 (utility model) 37/11,885; Mar. 24, 1962, 37/11,807; May 7, 1962 (utility model) 37/23,558; May 21, 1962, 37/20,749; July 2, 1962 (utility model) 37/36,220; July 4, 1962 (utility model) 37/36,595
9 Claims. (Cl. 340—174.1)

The present invention relates to a novel and useful magnetic recording and reproducing apparatus of the type wherein a perforated magnetic tape is driven by a sprocket-capstan mounted on a pulse-motor spindle while pulse-signals are recorded and reproduced, and particularly one in which a magnetic head is provided above said capstan.

Hitherto, magnetic recording and reproducing apparatus adapted to record signals on a perforated magnetic tape by rotating a sprocketed capstan spindle clockwise or counter-clockwise to drive the magnetic tape have been provided with magnetic head removed some distance from the capstan spindle, with the perforated magnetic tape being engaged in the sprocket-capstan spindle. In order to increase the speed of recording, the velocity of rotation of the capstan is raised to increase the velocity of a magnetic tape. This, however, causes vibrations on the magnetic tape running over the surface of the head, and the close adhesion between said tape and magnetic head becomes insufficient. Even when the head surface is pushed to avoid this, it is not satisfactory at high tape velocities. Moreover, mechanical loss, for instance, frictional loss, etc., becomes quite high, and, as a result, the machine and device have become disadvantageously large.

In a magnetic recording and reproducing apparatus of the kind referred to above, for instance, when a constant velocity driving is performed, relationship between the magnetic head and magnetic tape requires no adjustment, in order that the output voltage for reproduction may be maximum, while when a pulse motor is used for drive, instantaneous velocity of magnetic tape will vary. Accordingly, such an adjustment is needed, but as yet no solution has been obtained, which disturbs practical applications.

Moreover, in the magnetic recording and reproducing apparatus of the type referred to above, generally the displacement-time characteristics for the driving pulse of a pulse motor shows a characteristic of vibration near the new equilibrium point, and the amplitude of said vibration is higher and exceeds the pulse signal recording voltage with the result that the magnetic head records three pulse outputs. However, only the initial pulse output is needed in practice. The remaining two pulse outputs are not necessary, but rather harmful with the disadvantage of causing "drop-in."

On the contrary, the present invention is contemplated to perfectly avoid the aforesaid disadvantages by providing a magnetic recording and reproducing means, the substance of which being means, characterized in that a hanging magnetic head is sustained in contact by a suitable holding member on a sprocket-capstan spindle which is in turn secured to a spindle of a pulse motor, whereby a perforated magnetic tape is meshed with the sprockets of the capstan and said magnetic tape is passed over suitable guide rollers and driven by rotation of the pulse motor to enable recording and reproducing signals by the magnetic head.

Thus, according to the present invention, a magnetic head is directly attached with force to a sprocket-capstan, which drives the magnetic tape, and adapted to record and reproduce signals, whereby a relative positional relation between said magnetic tape and magnetic head is accurately retained and mechanical positional relationship between a feeding mechanism and recording position is advantageously maintained. In addition, according to the present invention, when tape velocity becomes high and even when the tape is caused to vibrate, the effect of this vibration is reduced, and the close-adhesion of the magnetic head with the tape is good thereby reducing "drop-out." Thus, required space is small, and a light weight and small type magnetic recording and reproducing means can be provided.

Nextly, according to an embodiment of the present invention, a magnetic head or a pulse motor is equipped with a minute vibration device and adapted always to effect recording and reproducing of signals under optimum conditions, with the object of providing a practical magnetic recording and reproducing means.

According to another embodiment of this invention, the magnetic tape is driven with a sprocket-capstan spindle, the magnetic tape is adhered on said capstan spindle by pushing between guide rollers, and a clearance is produced between the magnetic head and magnetic tape without causing vibrations of said magnetic tape thereby providing a novel and multiusable recording and reproducing means for transmitting signals.

According to a further embodiment of this invention, a sprocket-capstan spindle is constructed from a non-magnetic material, such as brass, polycarbonate resin, etc., or a low magnetic material, such as stainless steel, with the object of providing a magnetic recording and reproducing means capable of isolating a noise field due to driving current for the pulse motor. Furthermore, due to the construction of the capstan spindle the signal field is recorded only on a magnetic tape at high fidelity without recording the signal field on the capstan spindle.

According to another embodiment of this invention, a sprocket-capstan is made of synthetic resin, and as a result, while the usual metallic sprocket-capstan shows about ½ of 1 step of the amplitude at a new equilibrium on the responding characteristic curves of the rotating displacement vs. input pulse of the pulse motor, in the capstan of synthetic resin the amplitude becomes about $1/10$ of one step, which means the practical value is raised. According to the present invention, as the material is mild the driving of magnetic tapes is performed smoothly. Moreover, there is another advantage in that the magnetic tape is damaged. The object of the embodiment is to provide a magnetic recording and reproducing means having said advantages as well as an extremely large practical effect.

According to a further embodiment of this invention, guide rollers are attached with force onto the capstan spindle through the magnetic tape, and said magnetic tape is adapted to be held at least three points including the magnetic head onto said capstan spindle, with the object of providing a magnetic recording and reproducing means wherein the magnetic tape is driven with further exactness.

According to a further embodiment of this invention, a damper is provided on the pulse motor spindle to oppress vibrations due to the rotating displacement of the pulse motor, with the object of providing a magnetic recording and reproducing means wherein the moving characteristics of the pulse motor can be improved.

The present invention will be described in detail in reference to each embodiment as illustrated in the accompanying drawings, in which all the embodiments and diagrams are shown.

In the following, the present invention is described with reference to the accompanying drawings. However, it is, of course, apparent that the present invention is by no means limited to the following description, but a number of modifications would be possible which would not depart from the spirit and scope of this invention as defined in the appended patent claims. Similar parts are represented by similar symbols.

Figure 4:
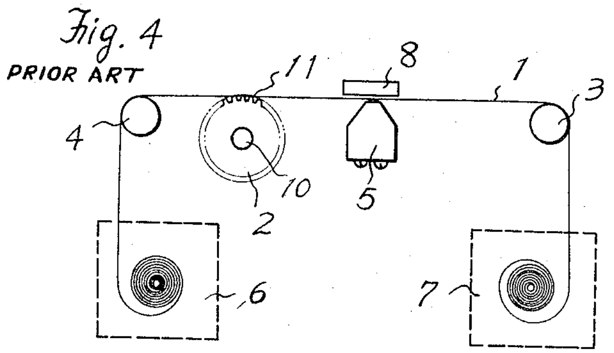
FIG. 4 is a diagrammatical illustration of a well-known magnetic recording and reproducing means.
Figure 5:
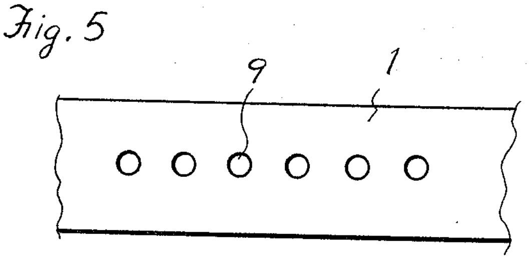
FIG. 5 is a diagrammatical illustration of magnetic tapes used thereby.

To begin with, in a usually known method of magnetic recording and reproducing, as shown in FIG. 4, the magnetic tape 1 having perforations 9 as illustrated in FIG. 5 is fixed by causing the perforations to mesh with sprocket 11 secured to capstan 2 which is driven. In this case, the capstan 2 is rotated clockwise or anticlockwise, while the magnetic tape 1 is shifted either to the right or the left, to ensure the recording or reproducing by the magnetic head 5 for recording, reproducing or for both recording and reproducing purposes. Furthermore, 3 and 4 are guide rollers, and 6 and 7 are magazines of the magnetic tape 1.

Further, according to the known method, mainly pulse signals are recorded as above mentioned. For high velocity recording, the number of revolutions of the capstan 2 is raised to increase the velocity of magnetic tape 1. However, the tape is as a result given vibration which runs about on the magnetic head 5, and, the close-adhesion between said magnetic tape and magnetic head becomes unsatisfactory. In this case, pushing down on the head surface with a pad 8 is not sufficient to prevent this loosening, and accordingly mechanical loss such as frictional loss increases which necessitates a large machine.

Figure 6:
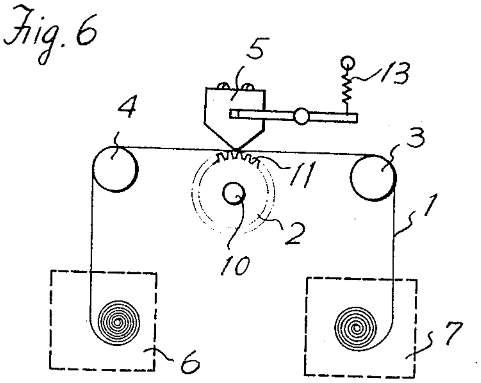
FIG. 6 is a diagrammatical illustration of the essential portion for the reproducing means shown in FIG. 1.
Figure 7:
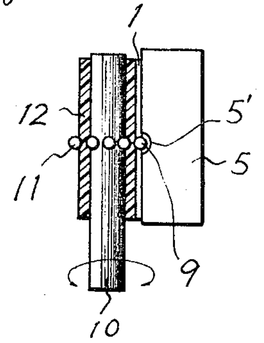
FIGS. 7 and 8 show respectively in a longitudinal sectional view parts of similar capstans illustrated in FIG. 6.

On the contrary, as shown in FIG. 6, the present invention is contemplated to provide a recording and reproducing means wherein a magnetic head 5 is directly adhered with force to the axial line of the capstan 2 around which a magnetic tape 1 is wound, said magnetic head being suitably suspended and held by a holding member 13, ensuring the recording and reproducing operations. As illustrated in FIG. 7, a sprocket 11 secured to the spindle 10 engages with perforations 9 of the magnetic tape 1 and is driven. A buffer member 12 made of, for instance, rubber, synthetic resin, foaming polyurethane, foaming styrol or vinylchloride, is concentrically mounted on the spindle 10, said buffer member acting similarly as a padding material for ordinary tape recorders.

Figure 8:
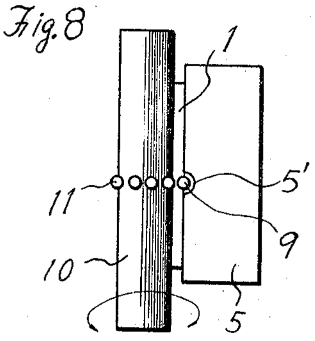

Thus, in above-mentioned construction the magnetic tape 1 is axially under compression by the magnetic head 5, and said magnetic tape is closely adhered to the magnetic head 5 under spring action of the buffer member 12 fitted to the spindle 10. The spacing loss is thereby remarkably decreased. Further, according to the kind of tape used, as shown in FIG. 8, when magnetic head 5 is adhered to the spindle 10 under compression through magnetic tape 1, the tape becomes a buffer plate, and a buffer member 12 as shown in FIG. 7 becomes unnecessary. In said head, a sprocket 11 is provided with a relief groove 5' to facilitate a close adhesion to a magnetic tape 1.

Figure 9:
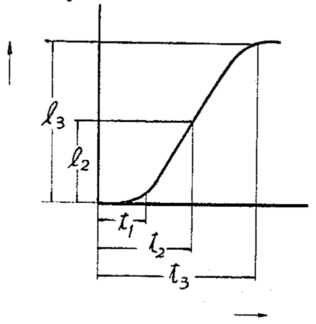
FIG. 9 is a diagram representing relationship between the time and rotational displacement of the pulse motor for said reproducing means.

In the magnetic recording and reproducing means having been constructed as above-mentioned, generally the motion characteristic of the pulse motor is as apparent from the rotational displacement-time curve shown in FIG. 9. When one pulse enters and the pulse motor performs a one step rotational displacement, a dead time of $t_1$ seconds appears and the velocity of displacement (differential value of said curve) becomes the maximum after $t_2$ is elapsed, and the displacement of one step finishes after $t_3$ seconds.

Figure 10:
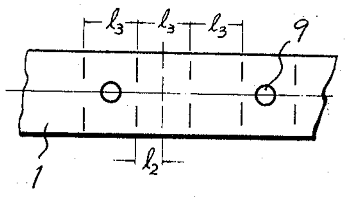
FIG. 10 is a diagram showing the relationship between the position of a signal record and position of a slit of the magnetic head on the magnetic tape.

Accordingly, if the position of signal pulse recorded on the magnetic tape is near $t_2$ seconds in FIG. 9, the regenerated voltage induced by the magnetic head will be the maximum. Generally speaking, the relative relation between the pulse signal position on the magnetic tape on one hand and the position of slit on the magnetic head on the other, that is, the space between the pulse signal record when the magnetic tape stands still and the position of slit of the magnetic head, is preferably chosen at $L_2$ corresponding to $t_2$ seconds in FIG. 9. Namely, referring to FIG. 10, a signal is recorded at a space of $L_3$ and a space $L_2$ is preferable between the signal recording position and head slit position for the stationary condition of the magnetic tape.

Now, for instance, a signal is recorded and reproduced by one and the same magnetic head, and the above-mentioned condition may be readily obtained by introducing a new signal pulse in the magnetic head with a lag of $t_2$ seconds after input of the signal pulse in the magnetic head. However, when the magnetic head is divided into a magnetic head for recording and that for reproducing, it is required that, in the recording magnetic head, the pulse enter in the pulse motor at a stand still position and after a lag of $t_2$ seconds, just as the position of said signal pulse is written on the magnetic tape has to pass through the regenerated magnetic head slit.

Similarly, when the magnetic tape is recorded by one magnetic recording and reproducing means and is submitted to the other magnetic recording and reproducing means, the relative position between the position of the tape at which a pulse signal is recorded and magnetic head should be adjusted by any suitable means to satisfy this condition.

Figure 11:
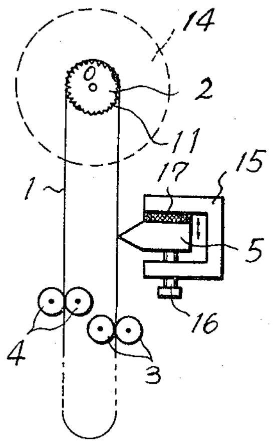
FIGS. 11 to 13 are schematic illustrations showing three embodiments for the micro-adjustment of relative position between the magnetic head and magnetic tape during the recording and reproducing operation for said reproducing means.

From what has been referred to above, it has been ascertained that, according to this invention, a microvibration meter is provided on a magnetic head or pulse motor, thus adapted to always perform the recording and reproducing signals under optimum condition, by adjustment. Referring to FIG. 11, by 14 is meant a pulse motor, 15 a housing for a magnetic head 5, 16 an adjusting screw, and 17 a cushion material. Adjusting positions for the magnetic head 5 is performed in the minute adjustment of positions for said magnetic head by shifting a minute adjusting screw 16 mounted on the housing 15 and effecting a movement of the magnetic head 5 in the direction of an arrow under utilization of resilience of the cushion material 17.

Figure 12:
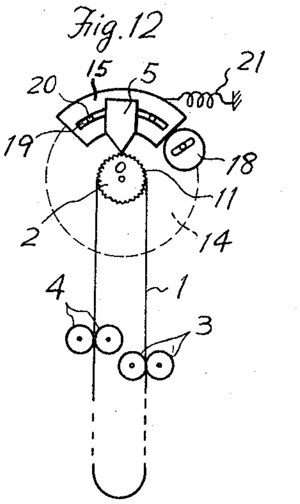

Alternatively referring to FIG. 12 illustrating a modification of the aforementioned example of the embodiment of the present invention, an eccentric cam 18 is used in lieu of the minute adjustment screw 16 used in the previous example. 19 is a circular arc guide groove engraved in the housing 15 for fixing magnetic head 5, 20 a guide pin, 21 a spring each of which acts to fix the position of magnetic head 5. The operation is as follows: The eccentric cam 18 is moved and, as a result, the housing 15 is rendered to move along the circular arc around θ of the capstan 2 and also the magnetic head 5 is made to revolve around the shaft of the capstan 2 and adhere closely to magnetic tape 1.

Figure 13:
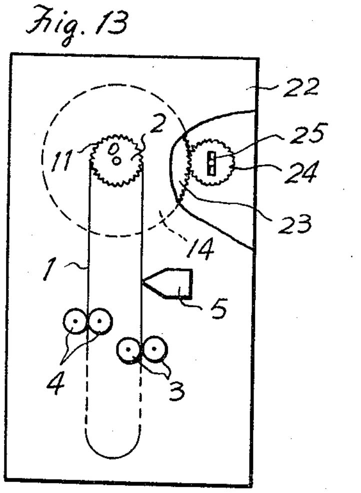

In an example of the embodiment of this invention illustrated by FIGS. 11 and 12, a method of shifting said magnetic head is used for minutely adjusting the relative position of the magnetic head 5 and magnetic tape 1. A method wherein a magnetic tape is shifted instead of a magnetic head is illustrated in FIG. 13. Namely, referring to said drawing, by 22 is meant a chassis, 23 and 24 respectively gears for micro-adjustment, 25 a knob. Gear 23 is secured to the pulse motor 14, while the gear 24 is secured to the chassis 22 for enabling the two gears to mesh with one another. As is apparent from the drawing, the pulse motor 14 is moved with the knob 25 for minute adjustment for altering the position of capstan 2 which is connected with said motor to shift the magnetic tape 1 secured to said capstan for adjustment.

In the magnetic recording and reproducing means, a satisfactory result can be obtained also by raising the driving velocity of magnetic tape without vibrating the magnetic tape. However, there is a disadvantage that the abrasion of the magnetic head as well as consumption of said magnetic tape would be remarkably high, because the magnetic tape 1 is compressed by the magnetic head 5 during the operation.

Figure 14:
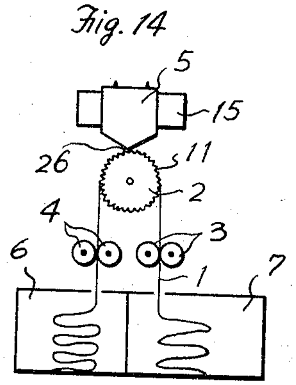
FIG. 14 is a schematic view of the arrangement for illustrating the behavior of said reproducing means.

On the contrary, according to this invention, the disadvantages referred to above are eliminated by arranging the magnetic head and magnetic tape with a minute space therebetween. Specifically, in FIG. 14, as perforations of the magnetic tape 1 are in mesh with a plurality of teeth of the sprocket 11 of the capstan 2, the magnetic tape is very much closely adhered to the axis 10 of the capstan 2 and driven. Particularly, a satisfactory close contact between said magnetic tape and spindle 10 of the capstan 2 is obtainable at a point of the magnetic tape 1 coming to a position opposite the magnetic head 5. Thus, the recording and reproducing of signals can be performed with approximately constant sensitiveness when the magnetic head 5 is held and fixed with constant clearance 26 from the magnetic tape 1.

Figures 15, 16:
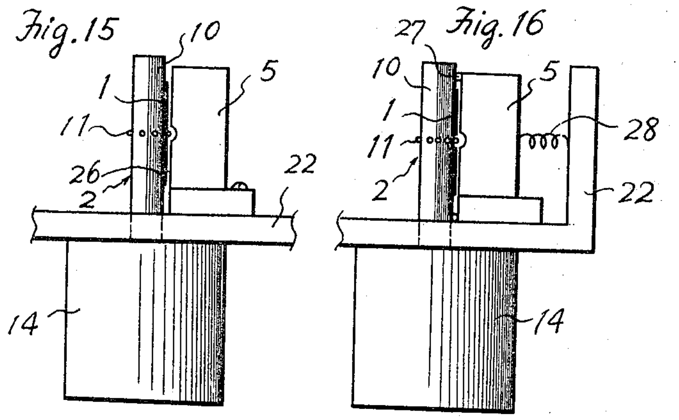
FIGS. 15 and 16 are schematic illustrations of two embodiments wherein a clearance is retained between the magnetic tape and magnetic head.

As concrete means for retaining a fixed clearance between the magnetic head 5 and magnetic tape 1, a magnetic head 5 is secured on a shassis 22 for mounting the shaft 10 of the capstan 2 and a driving motor 14 to keep constant a clearance 26 between the magnetic tape 1 and the surface of said magnetic head, as shown in FIG. 15. Or, alternatively, the magnetic head 5 is secured on the chassis 22, in such a manner that said magnetic head 5 may be slidable towards the spindle 10 of capstan 2, as shown in FIG. 16, and the magnetic head 5 is adhered under compression to the spindle 10 of capstan 2 by a spring 28 through an abrasion resisting spacer 27 to ration a clearance 26. Thus, the abrasion between the magnetic head and magnetic tape disappears completely and thus no needless frictional force occurs while the magnetic tape being driven. As a result, the driving power for said capstan spindle becomes low. For instance, when said capstan spindle is driven by a pulse motor, the driving velocity can be increased.

Figure 17:
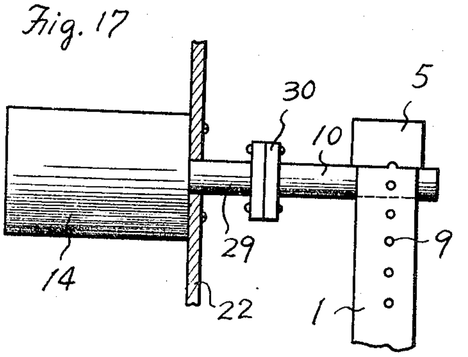
FIG. 17 is a schematic illustration of said reproducing means wherein the capstan spindle is made of material which is not ferromagnetic.

In the next place, FIG. 17 shows an embodiment of this invention, wherein the capstan spindle 10 is made of nonmagnetic or low magnetic materials, such as synthetic resin, brass and stainless steel, and the magnetic tape 1 having perforations 9 for driving is secured to the capstan spindle 10. The capstan spindle is driven by the pulse motor 14, the pulse motor spindle 29 being coupled with the capstan spindle 10 through a suitable coupling 30.

In the usually known magnetic recording and reproducing means, a steel spindle for the capstan is directly coupled with a steel shaft for the pulse motor. Since the sprocket capstan is made of magnetic material, a magnetic noise field due to the electric current for driving the pulse motor is introduced from the pulse motor spindle to the magnetic head and magnetic tape through the capstan spindle, and recording signals of the magnetic head penetrate through the magnetic tape and are recorded directly on the capstan spindle. The level of these jarring magnetic fields is quite large as compared with signals. Particularly, when pulse-recording is to be reproduced, it has been ascertained by experiments, that the drop-in and drop-out of signals are caused thereby.

Accordingly, according to the present invention, the jarring fields due to said pulse motor driving electric current are avoided by means of capstan spindle constructed with non-magnetic materials, such as brass, polycarbonate resin or the like, or low magnetic materials, such as stainless steel. Moreover, signal fields are not recorded directly on the capstan spindle, and only signal fields from the magnetic head are recorded on the magnetic tape and, as a result, the recording and reproduction of signals are performed at high fidelity.

Figure 18:
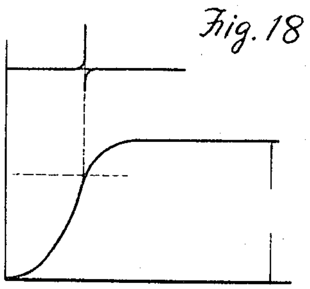
FIGS. 18 and 19 are diagrams respectively representing the responding characteristic and the pulse regenerating characteristic for the pulse motor in the construction of FIG. 17.
Figure 19:
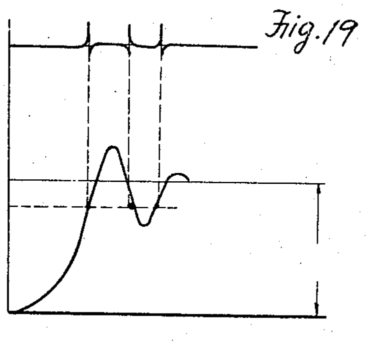

Further, in the embodiment shown in FIG. 17, the responding characteristic to the revolutional displacement, due to the input pulse of the pulse motor, is such that the signal recording position passes only once over the surface of magnetic head, when the embodiment is nonvibratory, and only one signal pulse is reproduced. The responding characteristic for the revolutional displacement due to the input pulse for the pulse motor is as shown in FIG. 18. If the capstan, stop screw, etc., are mounted on the spindle of the pulse motor, the inertia for the rotor system of the pulse motor will be increased, and the responding characteristic for the revolutional displacement will be vibratory around a new equilibrium point. If the amplitude of said vibration becomes large, signal recording position is exceeded as shown in FIG. 19. The signal recording position passes over the magnetic head surface of least three times, that is, more than three pulses are reproduced per one pulse signal. Thus, the capacity as a magnetic recording and reproducing means will be lost. In order to prevent the responding characteristic for revolutional displacement from becoming vibratory, the inertia of the rotor of the pulse motor should of course be selected as small as possible. It is also important that the inertia of the capstan which is added to the pulse motor spindle be reduced as small as possible.

It has been ascertained from the foregoing descriptions that, when according to the present invention the sprocket-capstan is constructed from light weight synthetic resin, e.g. polycarbonate and Teflon, the responding characteristics are remarkably improved as compared with usual metallic capstan. In such a case, a stop screw for fixing the capstan may also be made of synthetic resin in lieu of a metallic screw. But, also adhesive agents may be utilized effectively.

Figure 20:
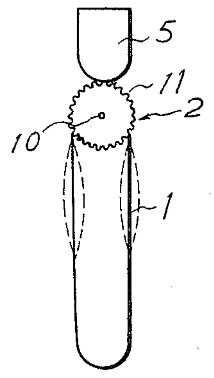
FIGS. 20 and 21 are respectively schematic illustrations showing the principles of operation of tape vibration inhibiting means incorporated in the driving mechanism for said reproducing means.
Figure 21:
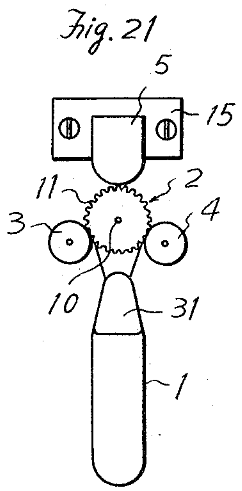

According to the embodiment shown in FIG. 20, a means for a sprocket 11 to sufficiently encircle round the spindle 10 of capstan 2 over nearly 180° of the contacting angle is used for meshing said sprocket 11 with perforations (not illustrated) of magnetic tape 1. However, even such a construction being taken, as the velocity of the magnetic tape 1 becomes higher and higher, a vibration occurs as shown in dotted line on the magnetic tape which is driven by sprocket 11. Once such a vibration begins to occur, when the magnetic tape 1 is introduced in the capstan spindle 10, the meshing of sprocket 11 with perforations of said magnetic tape becomes insufficient and, as a result, the driving of said magnetic tape is hampered.

Contrary to the above, according to the present invention, at a plurality of points including the magnetic head 5 the magnetic tape 1 is adhered onto the spindle 10 of the capstan by pushing guide rollers 3 and 4 to the spindle 10 of the capstan. It follows as a result that, now if the magnetic tape 1 commences to vibrate, the vibration will be oppressed by passing over the rollers 3, 4 and the tape is wound closely around the spindle 10 of the capstan. The tape is thereby accurately driven by sprocket 11, thus ensuring the exact relationship between said magnetic head and magnetic tape.

In the aforementioned embodiment, by 31 is meant a tape guide. Two guide rollers 3 and 4 are also provided which prevents the vibration of magnetic tape 1 near the magnetic head 5 from propagation. When the magnetic head and two guide rollers are arranged with a space of approximately 120°, the drive of magnetic tape will be more accurate as compared with cases when no roller is employed. Usually, vibrations of a magnetic tape have been too severe to use practically at a driving velocity of 100 steps per second, while now, according to this invention, practical applications of this recording means are possible even at a driving velocity of 300 steps per second.

Figure 23:
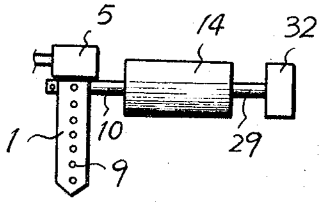
FIG. 23 is a schematic representation for showing embodiments for improving the kinetic characteristic of the pulse motor for said reproducing means.

In the next place a spindle 29 of pulse motor 14 is shown in FIG. 23 wherein is proivded a damper 32.

Figure 22:
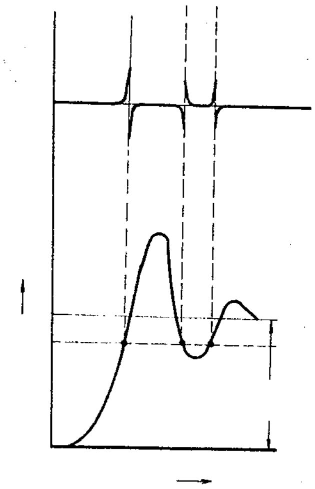
FIG. 22 represents a time-displacement diagram and a regenerated voltage-time diagram respectively in the usually known magnetic reproducing means.

Generally, as illustrated in FIG. 22, the time-displacement characteristic of the driving pulse for pulse motor 14 possesses a vibration characteristic in the neighborhood of a new point of equilibrium. If the amplitude of said vibration is large, and when the pulse signal-recording position is passed by the magnetic pulse 1, the wave form of the regenerated voltage for magnetic head 5 records three output pulses as illustrated. Nevertheless, indeed, only initial output pulse $PV_1$ is needed, and the remaining two output pulses $PV_2$ and $PV_3$ are not necessary and in fact are rather harmful and may cause "drop-in." Therefore, the magnetic recording and reproducing means of this type can eliminate all such vibrations if such occur by suppressing the amplitude thereof so that the signal recording position may not be thereby exceeded.

Figure 24:
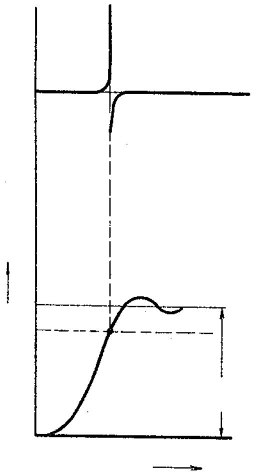
FIG. 24 represents characteristic diagrams for displacement-time and regenerated voltage-time, in the embodiment shown in FIG. 23.

It may be ascertained from what has been described above, that, according to the present invention, and as illustrated in FIG. 22, when a damper 32, for instance, a magneto damper is mounted on the spindle 10 of the pulse motor 14, the magnetodamper is more effective in proportion to the velocity of displacement to suppress the vibratory phenomenon. The characteristic is as shown in FIG. 24. Moreover, in this embodiment of this invention, the motor 14 is separate from the damper 32. Adjustment is therefore easily effected from outside in order to attain the optimum damping condition of the damper. The embodiment may be conveniently assembled and adjusted by either changing the exciting current according to the loading condition, or adjusting the clearance, or otherwise. Further, said magneto damper may be, of course, replaced with an oil or air or other damper.

Figure 1:
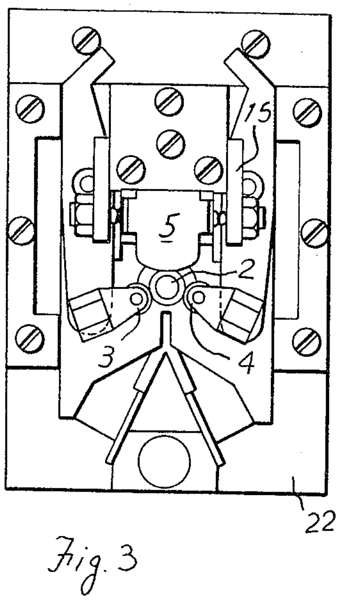
FIG. 1 is a front view of the magnetic recording and reproducing means according to this invention.
Figure 2:
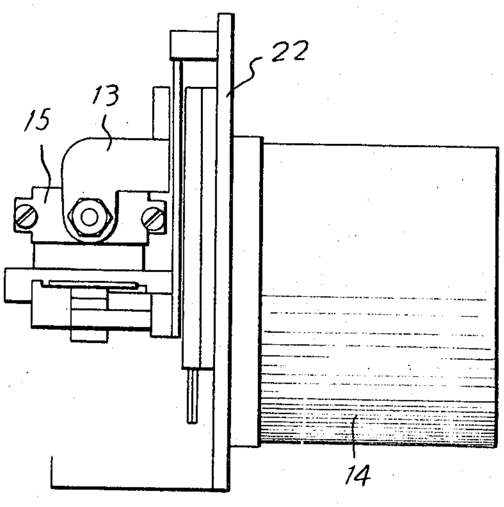
FIG. 2 is a right hand side view of FIG. 1.
Figure 3:
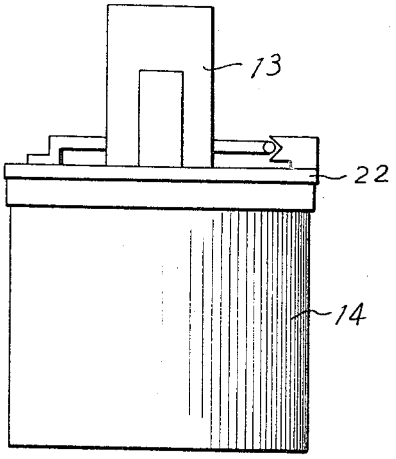
FIG. 3 is a back face view of FIG. 1.

The magnetic recording and reproducing means according to the present invention having advantages described in all embodiments of this invention referred to above are shown in FIGS. 1 to 3 as concrete practical examples. In said reproducing means, a perforated magnetic tape is, of course, driven by a sprocket-capstan mounted on the spindle of a pulse motor, thus adapted to record and reproduce signals with a magnetic head.

What I claim is:

1. A magnetic recording and reproducing apparatus which employs a perforated magnetic tape as a record medium, comprising:

a sprocketed capstan the teeth of which are adapted to engage the perforations of said magnetic tape, a pulse motor connected to said sprocketed capstan, said capstan being driven in a clockwise or anticlockwise direction by said pulse motor to thereby move a magnetic tape engaged by said capstan in one or another direction in discrete steps, a magnetic recording and reproducing head, and a holding member supporting said magnetic recording and reproducing head and urging said head into contact with said sprocketed capstan.

2. A magnetic recording and reproducing apparatus as recited in claim 1, wherein an elastic buffer member made of a resilient material is concentrically mounted on said sprocketed capstan and acts as a padding material to urge a magnetic tape into close contact with said magnetic recording and reproducing head.

3. A magnetic recording and reproducing apparatus as recited in claim 1, wherein said magnetic recording and reproducing head has a groove formed therein perpendicular to the axis of said sprocketed capstan and in registry with the teeth thereof so as to prevent the teeth of said capstan from touching said magnetic head.

4. A magnetic recording and reproducing apparatus as recited in claim 1, wherein said holding member includes means for adjusting the relative position between the signal recording position on a perforated magnetic tape and said magnetic head.

5. A magnetic recording and reproducing apparatus as recited in claim 1 further including means for maintaining a minute clearance between a magnetic tape engaged by the teeth of said sprocketed capstan and said magnetic recording and reproducing head.

6. A magnetic recording and reproducing apparatus as recited in claim 1 further including a pair of guide rollers urging a magnetic tape engaged by said sprocketed capstan into contact therewith, said magnetic recording and reproducing head and said pair of guide rollers being equally spaced about the circumference of said capstan.

7. A magnetic recording and reproducing apparatus as recited in claim 1 further including damping means attached to said pulse motor for suppressing vibrations from the incremental rotary displacement of said motor.

8. A magnetic recording and reproducing apparatus as recited in claim 1, wherein said sprocketed capstan is made of a non-magnetic material thereby isolating said magnetic head and a magnetic tape from the noise fields produced by said pulse motor and preventing the signal fields from being recorded directly on said capstan.

9. A magnetic recording and reproducing apparatus as recited in claim 8, wherein said non-magnetic material is a synthetic resin.

References Cited by the Examiner

UNITED STATES PATENTS

| | | | |
|---|---|---|---|
| 2,678,970 | 5/1954 | Vilkomerson ------ | 179—100.2 |
| 2,891,115 | 6/1959 | Hogan ----------- | 340—174.1 |
| 3,208,063 | 9/1965 | Jarrett et al. ------- | 340—174.1 |

BERNARD KONICK, *Primary Examiner.*

A. I. NEUSTADT, *Assistant Examiner.*